US009415309B2

(12) United States Patent
Bentdahl

(10) Patent No.: US 9,415,309 B2
(45) Date of Patent: Aug. 16, 2016

(54) SUPPLEMENTAL COMPUTING DEVICES FOR GAME CONSOLES

(71) Applicant: Nintendo Co., Ltd, Redmond, WA (US)

(72) Inventor: Joseph Thomas Bentdahl, Kirkland, WA (US)

(73) Assignee: Nintendo Co., Ltd., Kyoto (JP)

( * ) Notice: Subject to any disclaimer, the term of this patent is extended or adjusted under 35 U.S.C. 154(b) by 130 days.

(21) Appl. No.: 14/294,704

(22) Filed: Jun. 3, 2014

(65) Prior Publication Data

US 2015/0343306 A1    Dec. 3, 2015

(51) Int. Cl.
*A63F 9/24*       (2006.01)
*A63F 13/00*      (2014.01)
*G06F 17/00*      (2006.01)
*G06F 19/00*      (2011.01)
*A63F 13/323*     (2014.01)
*A63F 13/537*     (2014.01)

(52) U.S. Cl.
CPC ............. *A63F 13/323* (2014.09); *A63F 13/537* (2014.09)

(58) Field of Classification Search
CPC ...................................................... A63F 13/12
See application file for complete search history.

(56) References Cited

U.S. PATENT DOCUMENTS

| 4,521,014 | A * | 6/1985 | Sitrick | A63F 13/12 463/31 |
| 6,623,360 | B1 * | 9/2003 | Nakajima | A63F 13/10 463/40 |
| 2002/0176366 | A1 * | 11/2002 | Ayyagari | H04L 63/08 370/245 |
| 2004/0109417 | A1 * | 6/2004 | Castro | H04L 67/104 370/238 |
| 2010/0169590 | A1 | 7/2010 | Gordon-Carroll et al. | |
| 2010/0169668 | A1 | 7/2010 | Gordon-Carroll et al. | |
| 2011/0231892 | A1 * | 9/2011 | Tovar | H04L 63/10 726/1 |
| 2013/0132948 | A1 | 5/2013 | Hari et al. | |

FOREIGN PATENT DOCUMENTS

EP    2575044    4/2013

OTHER PUBLICATIONS

Wikipedia, "Geforce 256," product released Oct. 11, 1999, https://en.wikipedia.org/wiki/GeForce_256.*
JudyJFLA, "New grid for free rewards for spare computing," posted Nov. 28, 2011, http://www.flyertalk.com/forum/s-p-m/1285218-new-grid-free-rewards-spare-computing.html.*
Byford, "Sony to end PS3 Folding@home support after years of contribution to Stanford research" retrieved at „http://www.theverge.com/2012/10/22/3537502/sony-removing-ps3-folding-home>>, Oct. 22, 2012, 4 pages.

(Continued)

*Primary Examiner* — Kevin Y Kim
(74) *Attorney, Agent, or Firm* — Lee & Hayes, PLLC

(57) ABSTRACT

Supplemental computing devices that provide processing and/or storage resources to game consoles to assist these game consoles in executing a game. In some instances, a game console locally executes a copy of a game using resources of the game console. In addition, however, the game console may couple to a supplemental computing device that includes resources that the game console may also utilize to increase the speed or quality of a user's gaming experience. For instance, the supplemental computing device may couple via a physical connection (e.g., a wired connection) to the game console for processing data associated with the game and providing a result back to the console, and/or for storing game data on behalf of the game console.

22 Claims, 7 Drawing Sheets

(56) References Cited

OTHER PUBLICATIONS

Needleman, Dropbox rival Space Monkey puts 'cloud' in your house:, retrieved at <<http://www.cnet.com/news/dropbox-rival-space-monkey-puts-cloud-in-your-house/>>, Mar. 7, 2012, 6 pages.

"Space Monkey: Taking the cloud out of the datacenter", Space Monkey, retrieved at <<https://www.kickstarter.com/projects/clintgc/space-monkey-taking-the-cloud-out-of-the-datacente>>, May 17, 2013, 20 pages.

\* cited by examiner

SUPPLEMENTAL COMPUTING DEVICES FOR GAME CONSOLES

BACKGROUND

Users play an array of different games on an array of different types of game consoles. In some instances, these consoles execute games locally on the consoles, using the processing, storage, and other resources of the console. However, for some games—including games in which players play simultaneously against each other while located at different locations—the capabilities of the local console are not sufficient. Therefore, some gaming has moved "into the cloud". That is, server devices located at central locations (e.g., servers maintained by a producer of a game) may host or otherwise execute portions of a game, given that these server devices often have processing and storage capabilities that far exceed those of local game consoles. However, given that the servers need to receive information from and send information to the game consoles, the quality of "cloud gaming" relies heavily on the latency of the network between the server devices and the game console. Stated otherwise, a high degree of network latency may significantly degrade the gaming experience of the user.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
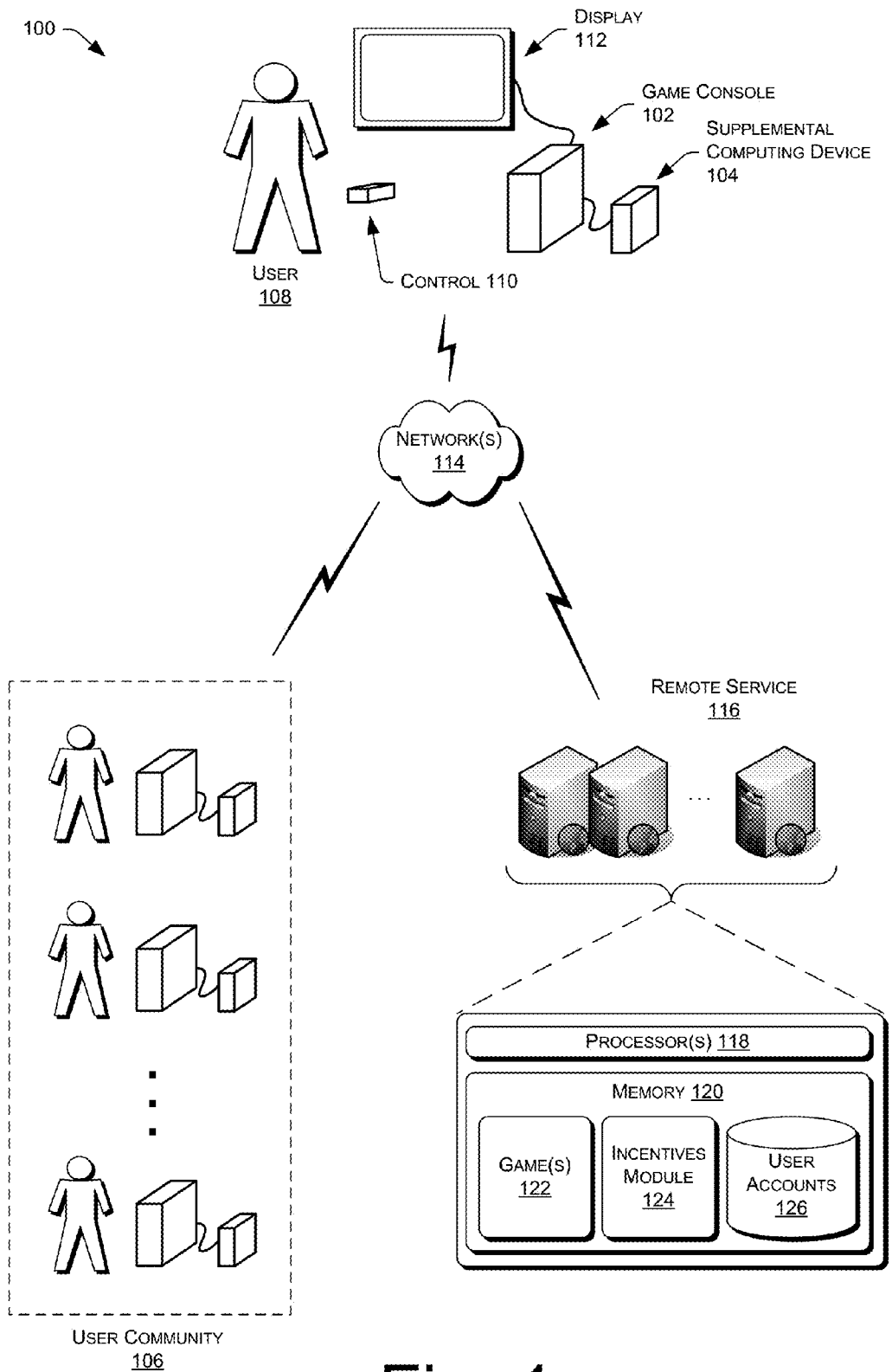
FIG. 1 illustrates an example environment that includes a game console locally executing a game, as well as a supplemental computing device coupled to the console for supplementing processing and storage resources of the game console. In addition, the environment includes multiple other game console and supplemental computing device combinations, such that the game consoles may utilize nearby supplemental computing devices to even further supplement the game-console resources.

Some implementations described herein include supplemental computing devices that provide processing and/or storage resources to game consoles to assist these game consoles in executing a game or performing other tasks on the game console (e.g., viewing or editing photos, watching videos, etc.). In some instances, a game console locally executes a copy of a game using resources of the game console. In addition, however, the game console may couple to one or more supplemental computing devices that includes resources that the game console may also utilize to increase the speed or quality of a user's gaming experience. For instance, the supplemental computing device may couple via a physical connection (e.g., a wired connection) to the game console for processing data associated with the game and providing a result back to the console, and/or for storing game data on behalf of the game console. Further, a console may couple to multiple supplemental computing devices in some instances. For instance, a console may include multiple "daisy-chained" supplemental computing devices, and/or may couple to directly to other supplemental computing devices.

In some instances, a supplemental computing device may also be used by other "remote" game consoles—or game consoles that do not locally (e.g., physically) couple to the supplemental computing device. For instance, the supplemental computing device may include a wireless communication interface (or may utilize the wireless communication interface of its local game console) to communicate with the remote game consoles over a network. The remote game consoles may then use the processing and/or storage resources of the supplemental computing device similar to how the local game console utilizes these resources, albeit in a wireless manner.

In these instances, a supplemental computing device may broadcast its service set identification (SSID) or may otherwise makes its presence known to remote game consoles. The supplemental computing device may broadcast its SSID directly or via its local game console. In either instance, remote game consoles may identify the broadcasted SSID, recognize the device as a supplemental computing device available for use, and may determine a connection strength between itself and the supplemental computing device (or a latency between itself and the supplemental computing device). In some instances, the game console may utilize supplemental computing devices having a connection strength that is greater than a threshold connection strength or that have a latency between the console and the supplemental computing device that is less than a threshold latency. Therefore, a game console may utilize supplemental computing devices that are relatively "close" (i.e. as measured in network latency or hop count) to the game console within a network, thus reducing the negative effects associated with distributed gaming, as discussed above.

A user of a game console may request to view all supplemental computing devices that are available for use by the game console of the user (i.e., all devices having a sufficient connection strength or sufficiently low latency). In response, the game console may output (e.g., for presentation on a connected display) an indication of the supplemental computing devices available for use. The user may then make a selection and, in response to the game console receiving this selection, the game console may establish a connection with the remote supplemental computing device. Thereafter, the game console may utilize the processing and/or storage capabilities of the remote supplemental computing device when executing its game, potentially in addition to utilizing the resources of a local supplemental computing device coupled to the device.

In some instances, a user associated with a supplemental computing device (i.e., an owner of the device) may determine when his or her supplemental computing device is available for use by others using various settings or rules. That is, the user can configure the resources to be shared during certain times and not during other times. For instance, the user may indicate that his or her supplemental computing device is available only when his or her local game console is not utilizing these resources. In addition or in the alternative, the user may specify certain times-of-day and/or days-of-the-week that the user is will to share the resources of the supplemental computing device with other game consoles. The supplemental computing device of the user may correspondingly make itself available at the indicated times. In some embodiments the user can also specify particular other users that are allowed to use the resources of the supplemental computing device. In some embodiments the user can specify the amount and types of resources that is made available to these other users. For instance, a user may share 100% of the resources when the local game console is not using these resources, but may only share 25% when the local console is using the resources.

In some instances, a user may be compensated based on an amount (e.g., time, raw resources, etc.) that the user shares his or her supplemental computing device or indicates that he or she is willing to share the supplemental computing device. This compensation may comprise any form of value, include access (e.g., time) to other supplemental computing devices maintained by other users, discounts on games, access to certain game content, points for redemption for digital or physical goods, information for display (e.g., as a badge) on a social network, or the like.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

FIG. 1 illustrates an example environment 100 that includes a game console 102 locally executing a game, as well as a supplemental computing device 104 coupled to the console for supplementing processing and storage resources of the game console 102. In addition, the environment 100 includes a user community 106 comprising users operating respective game console and supplemental computing device combinations, such that the game consoles may utilize nearby supplemental computing devices to even further supplement the game-console resources. Supplementing the game console resources may enhance the experience of a user that utilizes the game console for gaming, for watching videos, or for performing any other computing tasks using, at least in part, the game console 102.

As illustrated, a user 108 operates the game console 102 (e.g., via a remote control 110, voice command, motion sensing, gesture detection, etc.), which executes a game locally and outputs video content of the game on a display 112. In some instances, the game console 102 may also output audio of the game on one or more speakers. The game console may utilize its own resources to execute the game, as well as resources of the supplemental computing device 104. As illustrated, the supplemental computing device 104 may physically couple directly to the game console 102 via a cord or cable, while in other instances the supplemental computing device may couple to the game console wirelessly (e.g., via WiFi, Bluetooth®, etc.).

In some instances, the user 108 is able to acquire (e.g., rent, purchase, lease, etc.) the supplemental computing device 104 separately from the game console 102 and for the purpose of enhancing game play at the game console 102. In other instances, the game console 102 and the supplemental computing device 104 may be sold as a bundle. In some instances, acquisition of the supplemental computing device 104 may also provide the user with additional content not otherwise available to users that do not implement a supplemental computing device. This additional content may comprise entire games, portions of games (e.g., levels, characters, etc.), or content that is whole separate from the game (e.g., other applications, books, videos, songs, etc.). That is, game console 102 may not be capable of consuming some content (e.g. executing some games, portions of games, or game features) that require the additional capabilities of the supplemental computing device in conjunction with the capabilities of game console 102. For example, the supplemental computing device 104 may have additional graphics rendering abilities, increased processing capabilities, or storage capacity to allow the additional content to be executed by console 102.

In some instances, the user 108 may configure the supplemental computing device 104 for sharing its resources with other users of other game consoles, such as with the user community 106. Similarly, the user 108 may in some instances establish a connection with a supplemental computing device that is remote from the user 108 and the game console 102. For instance, the user may wirelessly connect with a supplemental computing device over a network 114, similar to how a user of the user community 106 may couple his or her game console to the supplemental computing device 104.

Regardless of whether the user 108 utilizes the local supplemental computing device 104, a remote supplemental computing device, or both, the supplemental computing device(s) may function to enhance the gaming experience of the user 108. The game console 102 may work in unison with the supplemental computing device(s) to offload processing of certain data or storage of certain data associated with the game. Because the sole or primary function of the supplemental computing device(s) may be to enhance the gaming experience by supplementing resources of the game console 102, in some instances the hardware of the supplemental computing device(s) is purposefully limited. For instance, the supplemental computing device(s) may include processor(s), memory for storage, and interface(s) for coupling to game consoles, but may be free from display drivers, audio drivers, a user control interface for interfacing with the control 110, or the like. In some instances, the supplemental computing device(s) include power supplies, while in other instances these devices can utilize power provided by respective game consoles (e.g. provided through the wired connection). In still other instances, different portions of a game or other application may be stored across multiple supplemental computing devices such that these portions are "closer" to users' game consoles and therefore may be rendered faster as compared to storing the data at remote servers. For instance, different portions of a map of a game may be stored across a group of supplemental computing devices that are within a relatively close network distance to one another such that the associated game consoles may each access these parts of the game, when needed, relatively quickly.

In instances where a game console utilizes resources from a remote supplemental computing device, the game console may couple to a supplemental computing device that is relatively "close" within a network. That is, the game console 102, or the coupled supplemental computing device 104, may identify other supplemental computing devices that have a threshold connection strength with the game console 102 or the supplemental computing device 104, or through which communications between the respective endpoints are less than a network latency threshold. By coupling to these devices, the techniques described herein limit the latency between the devices. The other supplemental computing devices could be within a relatively short distance (e.g. within the same household, building, or neighborhood) or could be some distance away. In some embodiments, the network distance can affect the types of functionality that the supplemental computing devices may provide. Network distance can be a measurement of latency between the game console and the respective supplemental computing device and/or the actual or estimated number of network hops between the console and the network computing device, for example. Thus in terms of network distance, a network computing device that is "close" has relatively low latency or hops, and one that is "far away" has relatively large latency or numbers of hops. Relatively close supplemental computing devices may be able to provide services at a nearly real-time speed (e.g. processing real-time graphics and sound effects), while relatively far away devices may only be able to provide asynchronous or supplementary support to the events occurring on the console (e.g. providing for weather effects in games, artificial intelligence (AI), etc.). In some cases the supplementary support provided by the supplemental computing devices could be based on a best-effort basis. For example, in a computer chess game, some amount of onboard AI may be possible on board the console to provide relatively quick analysis, but supplemental computing devices may perform additional AI analysis. If the additional analysis is not received from the supplemental computing devices within a threshold time, the console can use what is available to it (e.g. the analysis done by the console or by any supplemental computing device that has returned its respective AI analysis).

In some implementations, users, such as the user 102, may be compensated for sharing resources of a supplemental computing device with others. In some instances, local game consoles and/or supplemental computing devices track the sharing of these resources, while in other instances the environment includes a remote service 116 for doing so. As illustrated, the remote service 116 includes one or more processors 118 and memory 120. The memory 120 may store one or more games 122 or portions of games, an incentives module 124, and information regarding user accounts 126. In some instances, the remote service 116 may supplement the execution of games executed at the game consoles (using the gaming applications 122 stored at the service 116).

The user accounts 126, meanwhile, may store information regarding which users (or corresponding game consoles) are associated with supplemental computing devices and whether or how these users have shared these devices. The incentives module 124 may then provide compensation of any sort of value to users that have shared resources amongst users of the user community 106. In some instances, this compensation comprises access to other supplemental computing devices. That is, users that share resources may similarly utilize other supplemental computing devices, potentially in equal amounts of what they shared (measured in time or resource amounts). In other instances, the compensation comprises free or discounted additional access to game content, free or discounted games or applications, points or currency redeemable at an offering service for goods or services, a badge or other information sharable on a social-network site, or the like.

As described in further detail below, a game console may also couple to multiple supplemental computing devices to even further increase capabilities of the resulting game system. For instance, multiple supplemental devices may be daisy-chained to one another and/or the game console may be physically coupled or wirelessly coupled to other supplemental computing devices.

Figure 2:
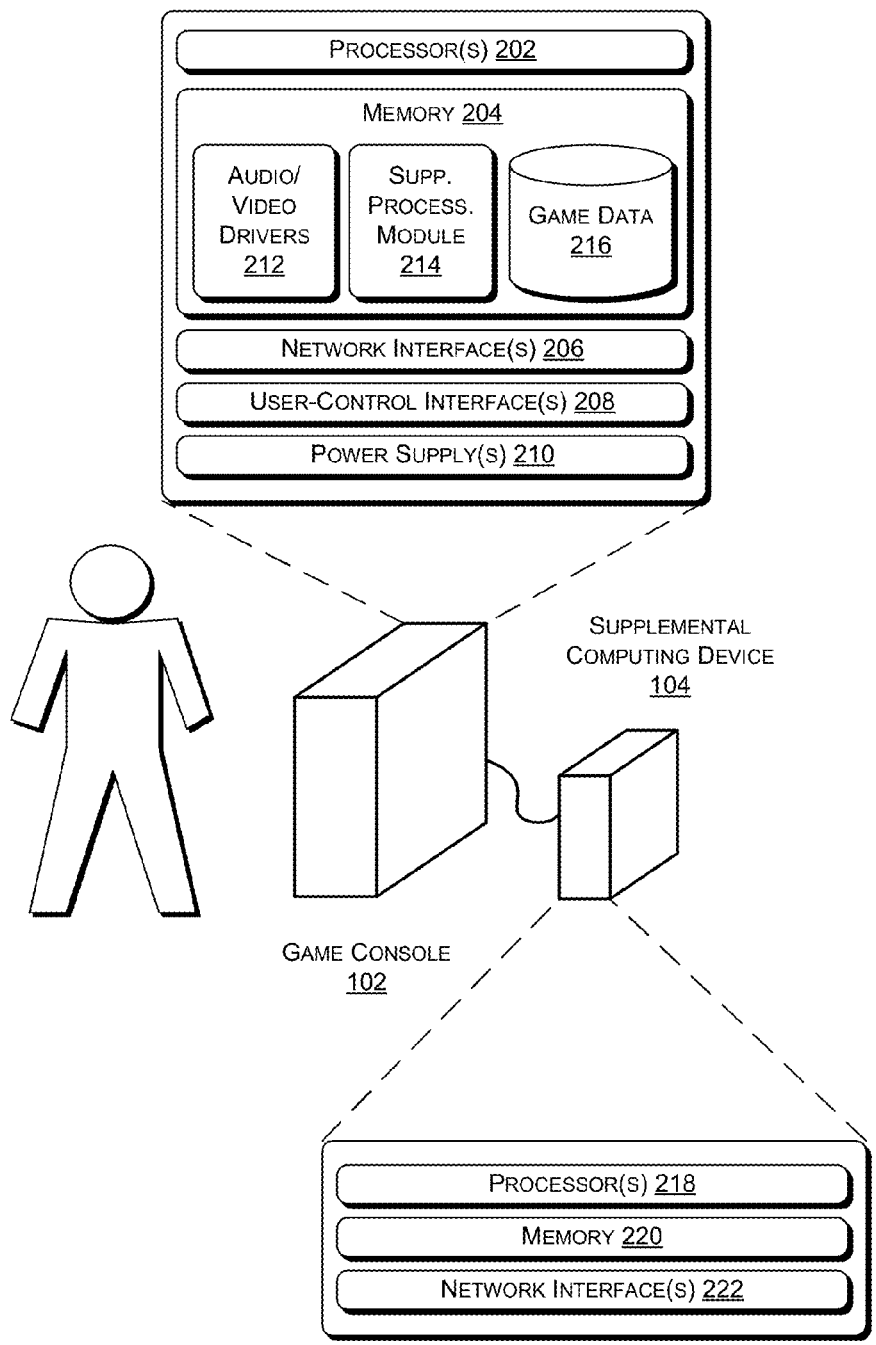
FIG. 2 illustrates select components of a game console and a supplemental computing device from FIG. 1.

FIG. 2 illustrates select example components of the game console 102 and the supplemental computing device 104 from FIG. 1. The game console 102 may take the form of any suitable type of computing device, e.g., mobile, semi-mobile, semi-stationary, or stationary. Some examples of a game console may include a "dedicated game console" in which the sole or primary purpose is to cause output (e.g., visually and audibly) of games for play by a user, potentially with use of a remote control, but potentially without. The game console may include its own display and/or be configured to be easily connected to external displays like televisions and projectors. In other instances, game consoles may take the form of tablet computing devices, smart phones or mobile communication devices, laptops, netbooks and other portable computers or semi-portable computers, desktop computing devices, terminal computing devices and other semi-stationary or stationary computing devices, wearable computing devices, or other body-mounted computing devices, or other computing devices capable of sending communications and performing the functions according to the techniques described herein.

In the illustrated example, the game console 102 includes one or more processors 202, memory 204, one or more communication interfaces 206, one or more user-control interfaces 208 (e.g., to communicate with the remote control 110), and one or more power supplies 210. Each processor 202 may itself comprise one or more processors or processing cores. For example, the processor 202 can be implemented as one or more microprocessors, microcomputers, microcontrollers, graphics processing unit (GPU), digital signal processors, central processing units, state machines, logic circuitries, and/or any devices that manipulate signals based on operational instructions. In some cases, the processor 202 may be one or more hardware processors and/or logic circuits of any suitable type specifically programmed or configured to execute the algorithms and processes described herein. The processor 202 can be configured to fetch and execute computer-readable processor-executable instructions stored in the memory 204.

Depending on the configuration of the game console 102, the memory 204 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 204 may include, but is not limited to, RAM, ROM, EEPROM, flash memory, solid-state storage, magnetic disk storage, optical storage, and/or other computer-readable media technology. Further, in some cases, the game console 102 may access external storage, such as RAID storage systems, storage arrays, network attached storage, storage area networks, cloud storage, or any other medium that can be used to store information and that can be accessed by the processor 202 directly or through another computing device or network. Accordingly, the memory 204 may be computer storage media able to store instructions, modules or components that may be executed by the processor 202. Further, when mentioned, non-transitory computer-readable media exclude media such as energy, carrier signals, electromagnetic waves, and signals per se.

The memory 204 may be used to store and maintain any number of functional components that are executable by the processors 202. In some implementations, these functional components comprise instructions or programs that are executable by the processors 202 and that, when executed, implement operational logic for performing the actions and services attributed to the game console 102. Functional components of the game console 102 stored in the memory 204 may include audio and/or video drivers 212 for output game content on a display, speakers or the like, a supplemental processing module 214, and game data 216.

The supplemental processing module 214 may be effective to determine when a supplemental computing device detachably couples to the game console and, in response, may be effective to utilize the coupled device. This may include providing game data to the device for processing, providing game data to the device for storage, retrieving stored game data, or the like. In addition, the module 214 may be used to determine other supplemental computing devices within range of the console such that the console 102 may utilize the devices 102. In some instances, the device and/or their coupled consoles broadcast SSIDs or other identifiers such that the module 214 may determine a connection strength between the console 102 and each respective supplemental computing device, or a latency there between. After identifying supplemental computing devices within range (e.g., having a threshold connection strength, threshold latency, etc.), the module 214 may present this information to a user of the game console, who may select one or more supplemental computing devices to connect with. After receiving a user selection, the module 214 may attempt to establish a wireless connection with the selected devices and may begin utilizing the devices if successful.

Additional functional components may include an operating system for controlling and managing various functions of the game console and for enabling basic user interactions with the game console. In addition, the memory 204 may also store data, data structures and the like, that are used by the functional components. The memory 204 may also optionally include other functional components and data, which may include programs, drivers, etc., and the data used or generated by the functional components. Further, the game console 102 may include many other logical, programmatic and physical components, of which those described are merely examples that are related to the discussion herein.

The communication interface(s) 206, meanwhile, may include one or more interfaces and hardware components for enabling wired and wireless communication with various other devices over the network or directly. For example, communication interface(s) 206 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The supplemental computing device 104, meanwhile, includes one or more processors 218, memory 220, and one or more communication interfaces 222. In some instances, the functionality of the device 104 may be basic in order to keep a cost of the device 104 relatively low. As such, the device 104 may be free from drivers, video cards, user-control interfaces, and the like. The processors 218 may be used to process game data provided by the game console, while the memory 220 may be used, in part, for storing game data received from the console. In some instances, the interfaces 222 may include a physical communication interface for coupling with a local game console 102 and a wireless communication interface for coupling with one or more remote game consoles.

Figure 3:
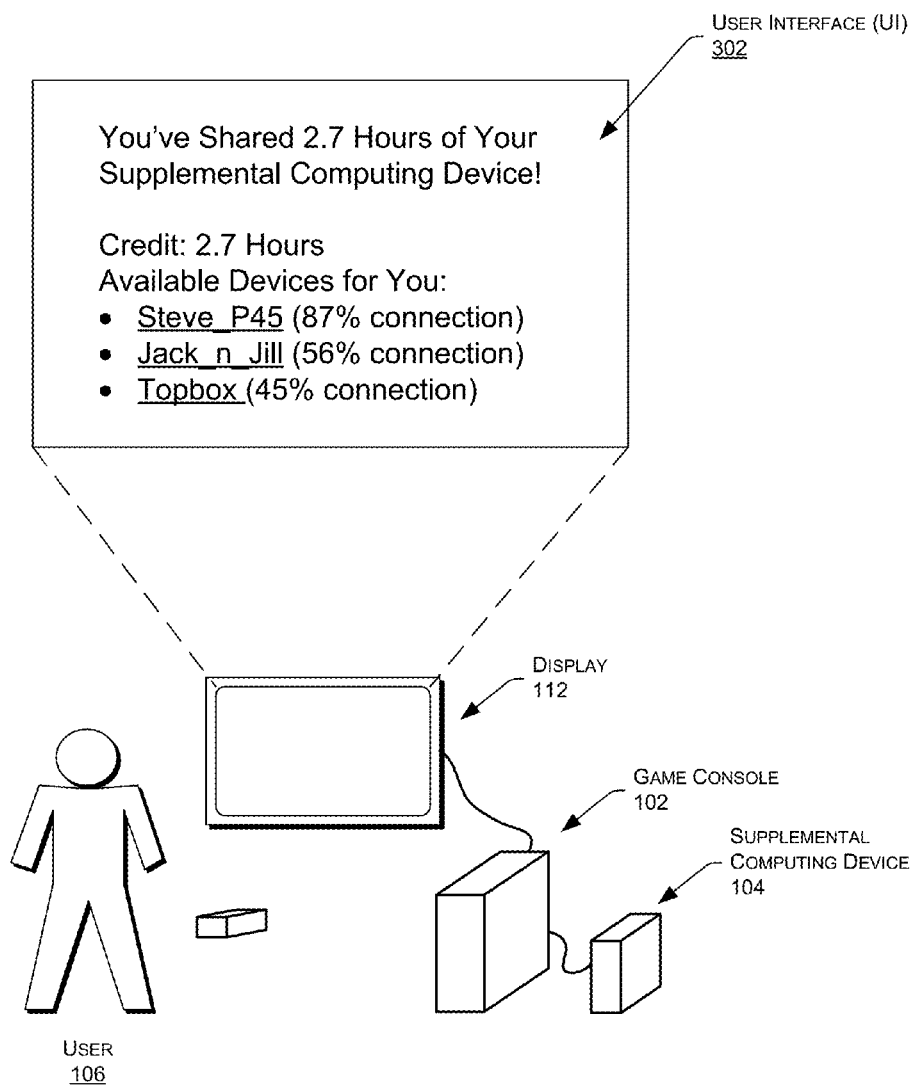
FIG. 3 illustrates an example user interface (UI) that a game console may display to allow a user to select a supplemental computing device that is remote from the game console to assist the game console in executing a game.

FIG. 3 illustrates an example user interface (UI) 302 that the game console 102 may render to allow the user 108 to select a supplemental computing device that is remote from the game console 102 to assist the game console 102 in executing a game. As illustrated, the UI 302 indicates an amount of time that the user 108 has shared his or her supplemental computing device 104 with other users of the user community 106. In addition, the UI 302 indicates supplemental computing devices that are available for use by the game console 102 of the user 108, along with a connection strength between the game console 102 and each respective supplemental computing device. The UI 302 also indicates an amount of time (or "credit") available to the user 108, which in this example is equal to the amount of time that the user has shared the resources of the supplemental computing device 104. As a user spends this "credit" (in terms of time or resources of other supplemental computing devices used), the user's credit may decrease. Similarly, the credit may increase as the use continues to share his or her supplemental computing device. While FIG. 3 illustrates an example UI 302, it is to be appreciated that the techniques may present this information in any other way, visually, audibly, or otherwise. In some instances, the UI may include additional information, such as an indication of a rating of each of the other supplemental devices (e.g., as rated by other users), how reliable these devices (e.g., based on how often they have previously dropped connections), and the like.

Figure 4A:
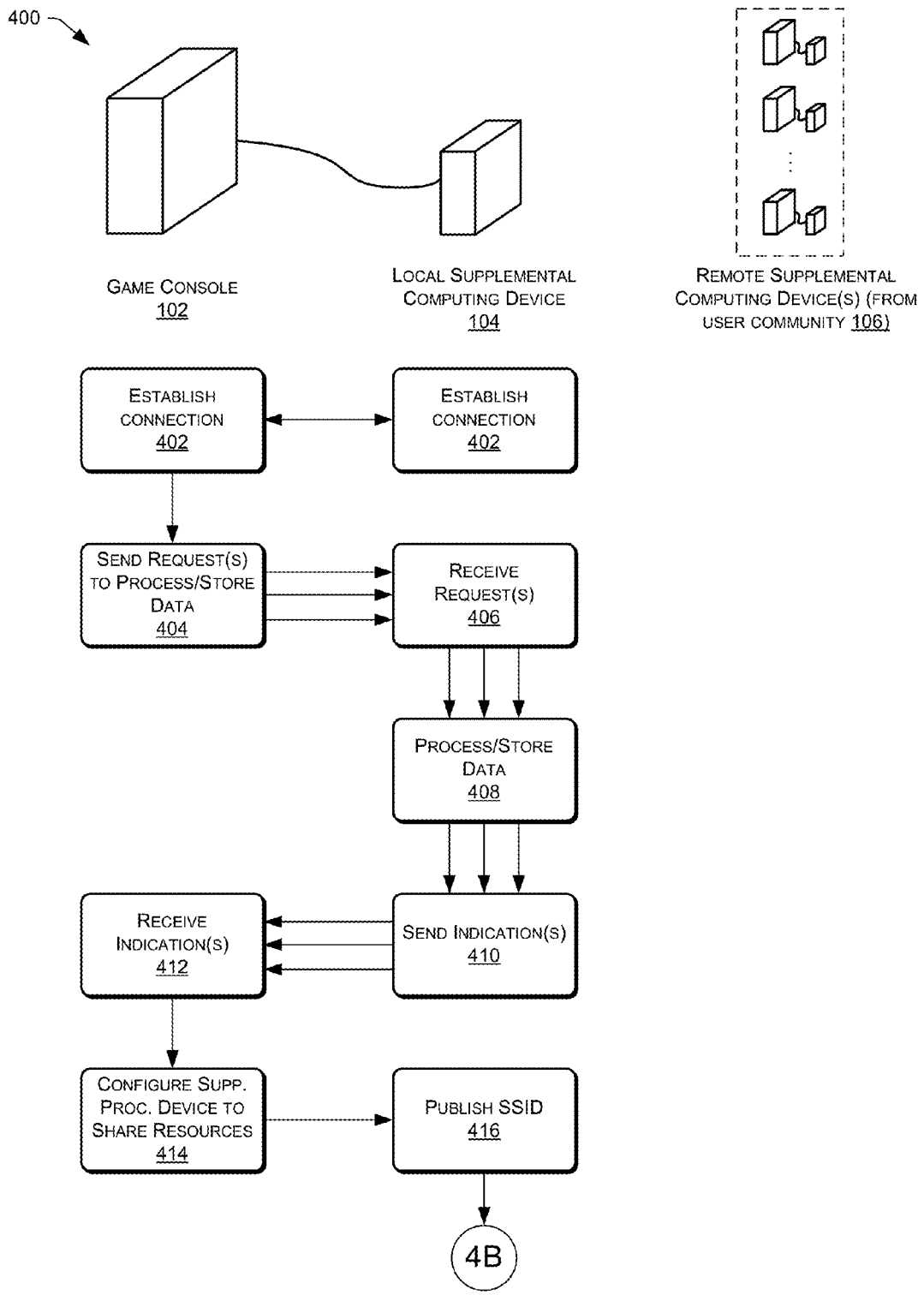
FIGS. 4A-C collectively illustrate a process for utilizing supplemental computing devices using the techniques described herein.
Figure 4B:
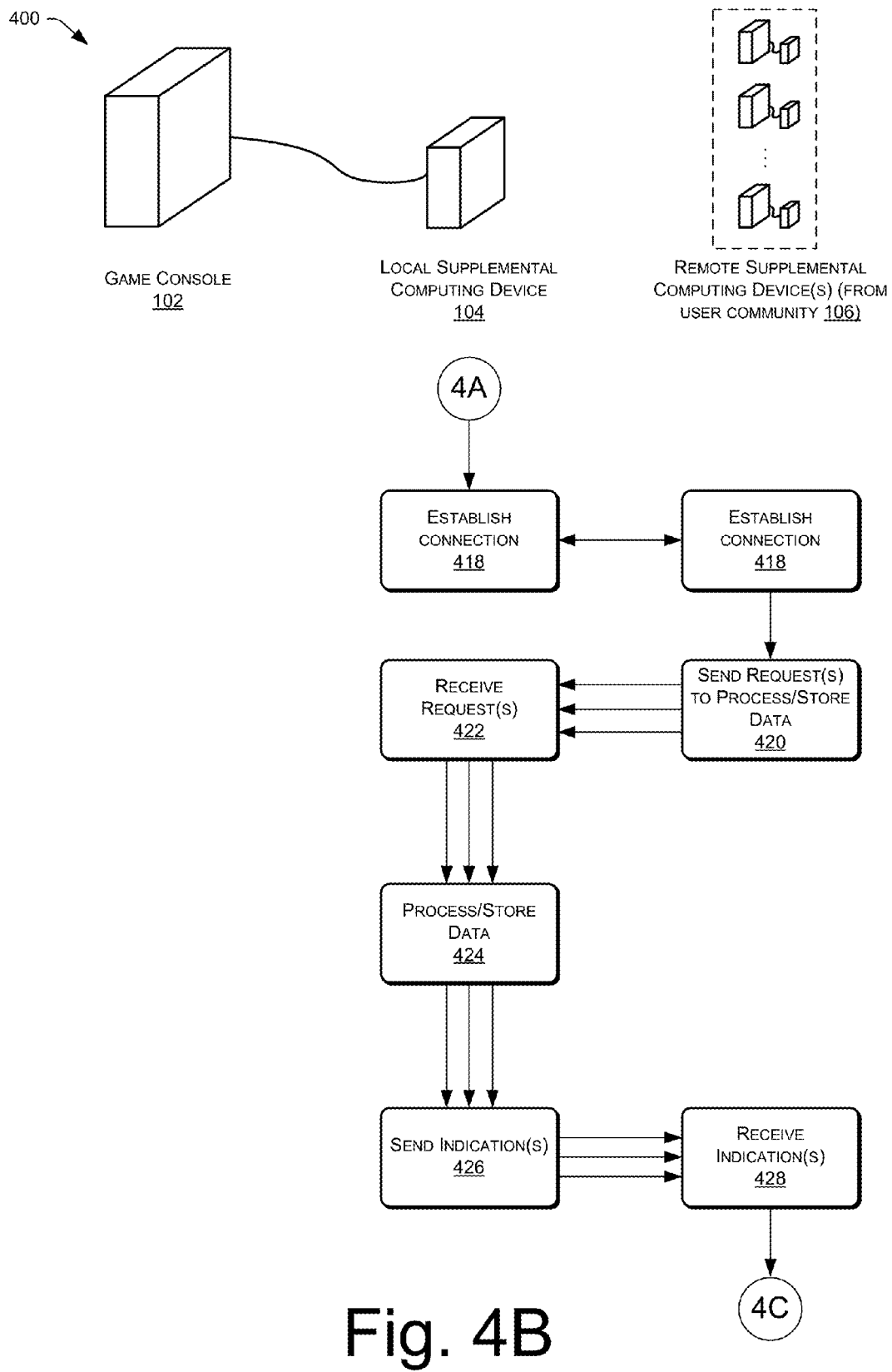
Figure 4C:
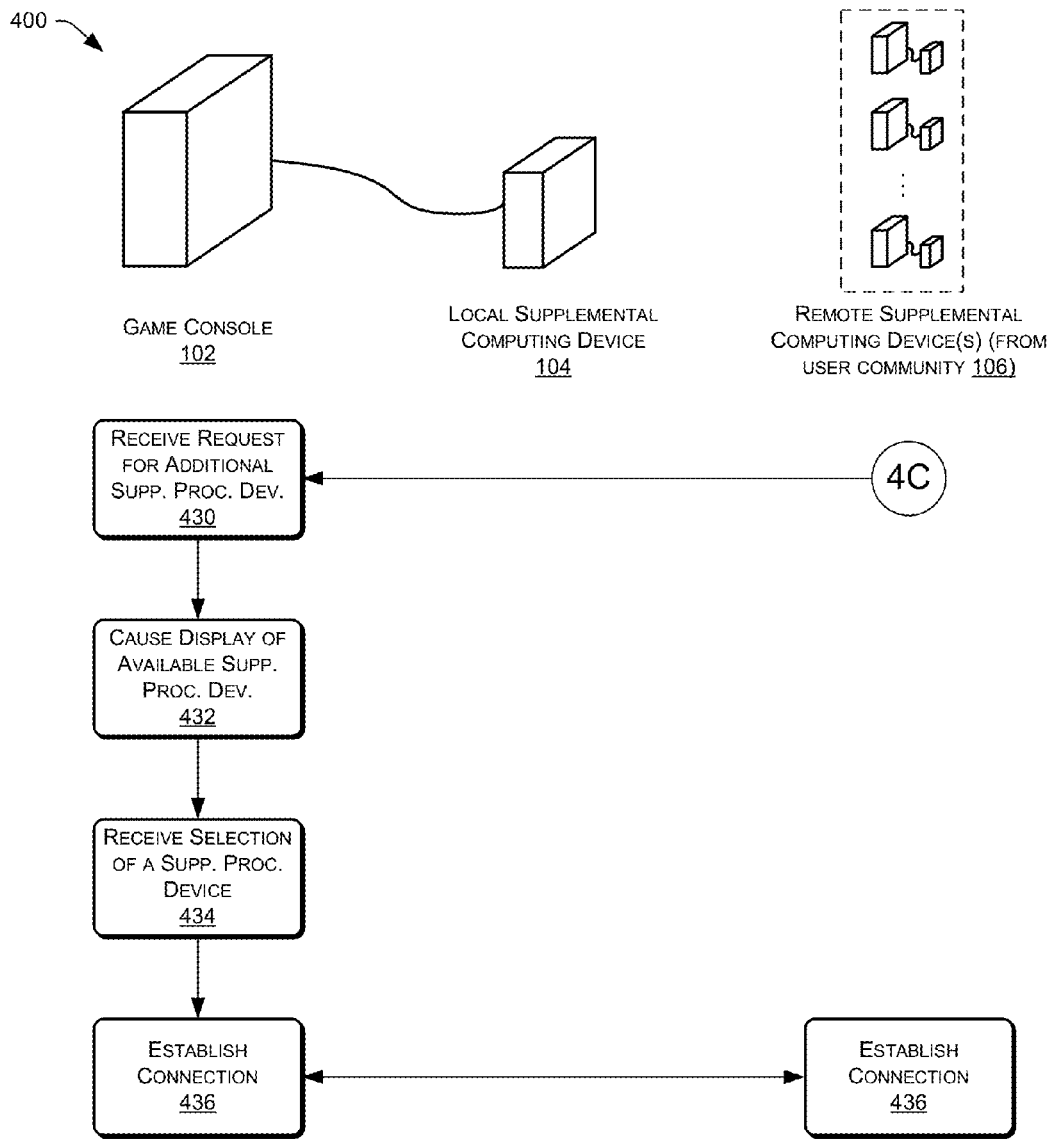

FIGS. 4A-C collectively illustrate a process 400 for utilizing supplemental computing devices using the techniques described herein. The process 400 and other processes described herein are illustrated as collections of blocks in logical flow diagrams, which represent a sequence of operations, some or all of which can be implemented by logic from hardware, software or a combination thereof. In the context of software or firmware, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. In the process 400 of FIG. 4, the operations listed under each entity may be performed by that entity in some instances.

At 402, the game console 102 and its local supplemental computing device 104 establish a connection, such as a result of a user physically coupling the game console 102 with the device 104. At 404, the game console 102 begins sending requests to the supplemental computing device 104 to process and/or store game data during execution of a game on the game console. At 406, the supplemental computing device 104 receives the requests and, at 408, may process and/or store the data as requested. As discussed above, for instance, the game console may send an algorithm and data for processing using the algorithm. In some instances, a console may send the same request to process the same or similar data to multiple consoles and may select one of the replies for use at the console. For instance, a console could send a different AI algorithm to different supplemental computing devices and may therefore receive multiple different results calculated using the different algorithms. The game console may then select which of the different results to act on or otherwise render on the display. The supplemental computing devices may additionally or alternatively provide any other type of support to the game console, including resources for performing specialized graphics processing, storing uncompressed game data so that the game console doesn't have to perform the de-compression on the fly, and the like.

An operation 410 represents the supplemental computing device 104 then sending respective indications back to the game console 102, indicating that the supplemental computing device 104 has performed the requested operation. These indications may also include a result of a request to process data. An operation 412 represents the game console 102 receiving the one or more indications (potentially along with the processed data).

At 414, the game console 102 configures its attached supplemental computing device 104 to share its resources with users of the user community. In some instances, the game console 102 configures the supplemental computing device 102 in this way in response to a request from a user to do so. At 416, and in response, the supplemental computing device 104 publishes its SSID such that other game consoles and/or supplemental computing devices are able to communicate with the supplemental computing device 104.

FIG. 4B continues the illustration of the process 400. At 418, the supplemental computing device 104 and at least one other remote game console establish a connection (e.g., a wireless connection). An operation 420 represents the remote game console then beginning to utilize the resources of the supplemental computing device 104 by sending requests to the supplemental computing device 104 to process and/or store game data. An operation 422 represents the supplemental computing device 104 receiving these requests and, at 424, processing and/or storing data in accordance with the requests. At 426, the supplemental computing device 104 sends one or more indications back to the remote game console (potentially along with processed data, as requested), which receives these indications at 428.

FIG. 4C concludes the illustration of the process 400. At 430, the game console 102 now receives a request to receive additional resources of a supplemental computing device that is remote from the game console 102. That is, a user of the game console 102 may have issued a request for the game console 102 to seek a wireless connection with a supplemental computing device (e.g., via the UI 302 of FIG. 3). Or, the game console 102 may have initiated this request after determining that the console needed additional processing resources and/or storage to effectively execute a particular game. In still other instances, the local supplemental computing device 104 may make this determination and, hence, may seek to couple to a remote supplemental computing device for buttressing the processing resources and/or storage available to the game console 102.

In this example, at 432, the game console 102 causes display of available supplemental computing devices, such as via the UI 302. At 434, the game console receives a selection (e.g., from the user or automatically based on latencies or connection strengths) of a remote supplemental computing device. The game console and the selected supplemental computing device then establish a connection at 436. At this point, the game console 102 is able to utilize resources of the remote supplemental computing device to assist the game console 102 executing a game.

Figure 5:
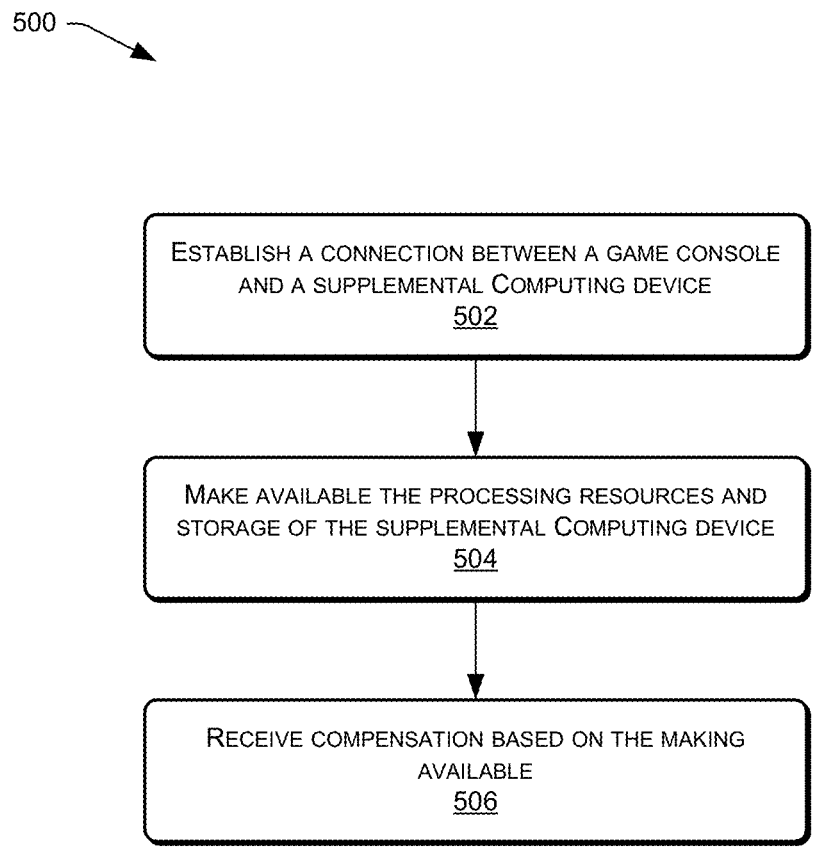
FIG. 5 illustrates a flow diagram of a process for providing some form of compensation to a user who shares resources of a supplemental computing device coupled to a game console of the user to other users in a network.

FIG. 5 illustrates a flow diagram of a process 500 for providing some form of compensation to a user who shares resources of a supplemental computing device coupled to a game console of the user to other users in a network. At 502, the process 500 includes establishing a connection between a game console and a supplemental computing device. This may include establishing a wired or wireless connection between a game console and a supplemental computing device that are proximate to one another (e.g., in a same room, same house, etc.). At 504, the process 500 makes available processing resources and storage of the supplemental computing device, potentially in response to a request from a user. Finally, at 506, the process 500 indicates that a user or user account may receive compensation based on making the resources of the supplemental computing device available for use by other users and/or consoles. This compensation may take the form of anything of value to the user, as described above.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A gaming system, comprising:
   a first game console comprising one or more processors configured to locally execute a first game and provide video output of the first game to a display and audio output of the first game to a speaker, the game console including a first physical communication interface and a first wireless communication interface; and
   a first supplemental computing device configured to detachably couple to the first game console via the first physical communication interface, the first supplemental computing device comprising:
      a second physical communication interface;
      a second wireless communication interface;
      one or more processors configured to provide, via the first and second physical communication interfaces, processing resources to the first game console to assist the first game console in locally executing the first game; and
      memory for receiving data associated with the first game from the first game console and storing the data for later access by the first game console;
   wherein the first game console is further configured to couple, via the first wireless communication interface, to a second supplemental computing device, the second supplemental computing device including one or more processors to provide processing resources to the first game console and memory for providing storage resources to the first game console; and
   wherein the one or more processors of the first supplemental computing device are configured to provide, via the second wireless communication interface, processing resources to a second game console for assisting the second game console in locally executing a second game on the second game console, the second game being different from the first game and the second game console being located remotely from the first game console.

2. The gaming system as recited in claim 1, wherein the one the one or more processors of the first game console are further configured to:
   identify additional supplemental computing devices within a threshold network distance of the first game console, the additional supplemental computing devices including the second supplemental computing device;
   determine a network distance between the first game console and each of the additional supplemental computing devices; and
   select, for use in assisting the first game console in locally executing the first game, the second supplemental computing device based at least in part on the determined network distances.

3. The gaming system as recited in claim 1, wherein the one the one or more processors of the first supplemental computing device are further configured to:
 identify additional supplemental computing devices within a threshold network distance of the first supplemental computing device, the additional supplemental computing devices including the second supplemental computing device;
 determine a network distance between the first supplemental computing device and each of the additional supplemental computing devices; and
 select, for use in assisting the first game console in locally executing the first game, the second supplemental computing device based at least in part on the determined network distances.

4. The gaming system as recited in claim 1, wherein neither the first supplemental computing device nor the second supplemental computing device include a display driver, an audio driver, and a user-control interface.

5. An apparatus comprising:
 a housing;
 an interface for coupling the apparatus with a first game console that resides in a first environment with the apparatus;
 one or more processors residing within the housing; and
 logic residing within the housing and configured to cause the one or more processors to perform acts comprising:
  receiving, while the apparatus is coupled to the first game console via the interface and while the first game console is executing a first game, a first request from the first game console to process first data associated with the first game;
  processing, at least partly in response to the first request, the first data to create a first result;
  providing the first result back to the first game console;
  receiving, while the apparatus is coupled to the first game console via the interface and while the first game console is executing the first game, a second request from the first game console to store second data associated with the first game;
  storing the second data at the apparatus at least partly in response to the second request;
  receiving a third request from a second game console to process third data associated with a second game that the second game console is executing, the second game being different from the first game and the second game console residing in a second environment that is remote from the first environment of the first game console and the apparatus;
  processing, at least partly in response to the third request, the third data to create a second result;
  providing the second result back to the second game console;
  receiving a fourth request from the second game console to store fourth data associated with the second game that the second game console is executing; and
  storing the fourth data at the apparatus at least partly in response to the fourth request.

6. The apparatus as recited in claim 5, wherein the apparatus couples to the first game console via a local connection and the apparatus couples to the second game console via a network connection.

7. The apparatus as recited in claim 5, the acts further comprising broadcasting a service set identification (SSID) associated with the apparatus such that game consoles that are remote from the apparatus may wirelessly communicate with the apparatus.

8. The apparatus as recited in claim 5, the acts further comprising:
 determining, prior to the processing of the third data, whether the first game console is currently utilizing the apparatus; and
 at least partly in response to determining that the first game console is currently utilizing the apparatus, refraining from processing the third data;
 and wherein the processing of the third data occurs at least partly in response to determining that the first game console is not currently utilizing the apparatus.

9. The apparatus as recited in claim 5, the acts further comprising:
 receiving a request from a user of the first game console or the apparatus to limit sharing resources of the apparatus with other game consoles to specific times; and
 configuring the apparatus to make its resources available to the other game console during the specific times and not during other times.

10. One or more non-transitory computer-readable media storing computer-executable instructions that, when executed by one or more processors of a first game console residing in a first environment, cause the one or more processors to perform acts comprising:
 sending, from the first game console and to a first supplemental computing device that resides in the first environment and is physically and detachably coupled to the first game console, a request to a process or store first data associated with a game that the first game console is executing;
 receiving an indication that the first supplemental computing device has processed or stored the first data associated with the game;
 identifying a second supplemental computing device physically and detachably coupled to a second game console, the second supplemental computing device being available for use by the first game console, the second supplemental computing device and the second game console residing in a second environment that is located remotely from the first environment in which the first supplemental computing device and the first game console reside;
 sending, from at least one of the first game console or the first supplemental computing device, to the second supplemental computing device, a request to a process or store second data associated with the game that the first game console is executing; and
 receiving an indication that the second supplemental computing device has processed or stored the second data associated with the game.

11. The one or more non-transitory computer-readable media as recited in claim 10, the acts further comprising:
 identifying other supplemental computing devices physically and detachably coupled to respective other game consoles that are available for use by the first game console, the other supplemental computing devices including the second supplemental computing device;
 determining a network distance between at least one of the first game console or the first supplemental computing device and each of the other supplemental computing devices; and
 selecting the second supplemental computing device for use by the first game console based at least in part on the network distances.

12. The one or more non-transitory computer-readable media as recited in claim 10, the acts further comprising:

identifying other supplemental computing devices physically coupled to respective other game consoles that are available for use by the first game console, the other supplemental computing devices including the second supplemental computing device;
determining a latency between at least one of the first game console or the first supplemental computing device and each of the other supplemental computing devices; and
selecting the second supplemental computing device for use by the first game console based at least in part on the latencies.

13. A method comprising:
establishing a connection between: (i) a first game console residing in a first environment, the first game console configured to locally execute a first game, and (ii) a supplemental computing device residing in the first environment and comprising processing resources and storage for use by the first game console;
making available, over a network, the processing resources and the storage of the supplemental computing device for use by a second game console executing a second game that is different than the first game and residing in a second environment that is remote from the first environment; and
receiving an indication that compensation has been granted based at least in part on the making available of the processing resources and the storage of the supplemental computing device to the second game console.

14. The method as recited in claim 13, wherein the connection between the first game console and the supplemental computing device comprises a physical connection, and the making available comprises making available the processing resources and the storage of the supplemental computing device over a network.

15. The method as recited in claim 13, wherein the compensation comprises access, by the first game console, to one or more other supplemental computing devices residing in respective environments that are different than the first environment.

16. The method as recited in claim 13, wherein the compensation comprises access to additional content associated with the first game, the additional content unavailable to users not associated with a supplemental computing device.

17. The method as recited in claim 13, wherein the compensation comprises points that are redeemable for items from a marketplace or information for display on a social network.

18. One or more non-transitory computer-readable media storing computer-executable instructions that, when executed by one or more processors of a first game console, cause the one or more processors to perform acts comprising:
causing display of an indication that a first supplemental computing device and a second supplemental computing device are available for use by the first game console, the first supplemental computing device coupled to a second game console and comprising processing and storage capabilities that supplement processing and storage capabilities of the second game console and the second supplemental computing device coupled to a third game console and comprising processing and storage capabilities that supplement processing and storage capabilities of the third game console;
receiving a selection of the first supplemental computing device; and
establishing a connection between the first game console and the first supplemental computing device while refraining from establishing a connection between the first game console and the second supplemental computing device, the established connection enabling the first supplemental computing device to supplement processing and storage capabilities of the first game console.

19. The one or more non-transitory computer-readable media as recited in claim 18, the acts further comprising identifying supplemental computing devices having a connection strength with the first game console that is greater than a threshold connection strength, and wherein the indication indicates the first and second supplemental computing devices as having respective connection strengths with the first game console that are greater than the threshold connection.

20. The one or more non-transitory computer-readable media as recited in claim 18, wherein the first game console also couples physically with a third supplemental computing device that is local to the first game console, and the established connection between the first game console and the first supplemental computing device comprises a connection over a network.

21. The one or more non-transitory computer-readable media as recited in claim 18, wherein the indication indicates at least one of: (1) an amount of resources of at least one of the first supplemental computing device or the second supplemental computing device that the first game console is able to utilize, or (2) an amount of time for which the first game console is able to utilize resources of at least one of the first supplemental computing device or the second supplemental computing device.

22. The one or more non-transitory computer-readable media as recited in claim 21, wherein:
the first game console also couples physically with a third supplemental computing device that is local to the first game console, and the established connection between the first game console and the first supplemental computing device comprises a wireless connection; and
the at least one of: (1) the amount of resources, or (2) the amount of time is based at least in part on an amount that the third supplemental computing device that is local to the first game console has been shared with or made available to share with other game consoles.

* * * * *